United States Patent Office 3,459,802
Patented Aug. 5, 1969

3,459,802
TRIOXIMINOPOLYHALOCYCLOALKANES AND PROCESS
Earl T. McBee, 420 Forest Hills Drive, West Lafayette, Ind. 47906, and John J. Turner, 2219 Brookline Road, Wilmington, Del. 19803
No Drawing. Filed Nov. 3, 1966, Ser. No. 591,710
Int. Cl. C07c 131/02
U.S. Cl. 260—566                           8 Claims

ABSTRACT OF THE DISCLOSURE

Trioximinopolyhalocycloalkanes, such as 1,2,3-trioximinotetrafluorocyclobutane and 1,2,3 - trioximinotetrafluorocyclopentane are new compounds, which have been found useful in the preparation of chelating agents for metal ions. The novel compounds are made by reaction of cyclic halogenated olefins, such as hexafluorocyclobutene or octafluorocyclopentene, with a lower alcoholic solution of hydroxyl amine.

---

This invention is concerned with novel compositions of matter, and a process of preparation thereof. More specifically, the inventive concept of the present invention resides in the novel compounds described as 1,2,3-trioximes, which may be prepared by the reaction of certain cyclic halogenated olefins with hydroxylamine.

In accordance with the present invention there are provided the novel compounds described as 1,2,3-trioximinopolyhalocycloalkanes of the following structure:

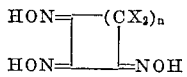

wherein $n$ is a number from 1 to 2, and X is a halogen atom, such as fluorine.

Illustrative examples of the novel compounds of the present invention include, 1,2,3-trioximinodifluorocyclobutane, and 1,2,3 - trioximinotetrafluorocyclopentane of the following structures:

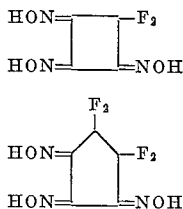

The novel compounds of the present invention are prepared by the reaction of certain cyclic halogenated olefins with an alcoholic solution of hydroxylamine. Specifically, the process is accomplished by reacting a compound of the formula

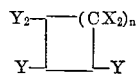

wherein X is a halogen atom, such as fluorine, and Y is a halogen atom selected from the group consisting of chlorine and fluorine, and $n$ is a number from 1 to 2, with an alcoholic solution of hydroxylamine, preferably prepared in situ. Among the cyclic halogenated olefin reactants that may be utilized in the process of the present invention are the following:

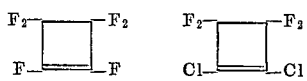

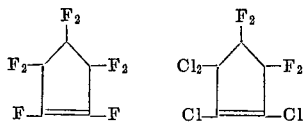

The reaction was accomplished in the presence of an anhydrous alcoholic solution of hydroxylamine, preferably prepared in situ by combining a saturated solution of an alkali metal alkoxide with an excess of hydroxylamine hydrochloride, followed by filtration to remove the alkali metal chloride formed. Examples of alkali metal alkoxides which may be employed include, among others, sodium methoxide, sodium ethoxide and potassium methoxide, with sodium methoxide being preferred, while examples of alkanols that are employed include those alcohols having from 1 to about 6 carbon atoms such as methanol, ethanol, propanol, butanol, hexanol and the like, as well as their various isomer forms. The preferred alcohol is methanol.

Generally the hydroxylamine solution is prepared by the addition of a solution of alkali metal alkoxide in alcohol, to a solution of hydroxylamine hydrochloride in alcohol, followed by separation of the alkali metal chloride formed, and recovery of a solution of hydroxylamine in alcohol. The first solution is comprised of an excess of alcohol, namely from about 5 to about 25 moles of alcohol to 1 mole of alkali metal alkoxide, and preferably 10 to 20 moles of alcohol to 1 mole of akali metal alkoxide. Also effective are about 5 to about 25 moles of alcohol to 2 or more moles of alkali metal alkoxide. Lesser and greater amounts can be used, providing that they do not adversely affect the reaction mechanism.

With respect to the second solution, it is comprised of about 10 to about 30 moles of alcohol, and preferably 12 to 20 moles of alcohol and 1 mole of hydroxylamine hydrochloride. Also effective are about 10 to about 30 moles of alcohol to 2 or more moles of hydroxylamine hydrochloride. The use of an excess of the hydrochloride is desirable in order to avoid undesirable side reactions.

The two solutions are mixed together, and reacted at a low temperature, which may be from 0 to 50 degrees centigrade, and preferably is from 0 to 30 degrees centigrade, thereby resulting in an alcoholic solution of hydroxylamine containing from about 15 to about 30 moles and preferably 20 to 25 moles of alcohol to 1 mole of hydroxylamine or from about 15 to about 30 moles of alcohol to 2 or more moles of hydroxylamine. The temperature of the reaction can vary over wide ranges and will depend upon the reactants utilized as well as the yield of product desired. Generally, the reaction temperature will depend upon the alcohol reactant employed in effecting preparation of the hydroxylamine, and the temperature at which said alcohol refluxes. The temperature will range from below 0 degrees centigrade to about 75 degrees centigrade, and preferably from 30 degrees centigrade to 65 degrees centigrade. Lower and higher reaction temperatures can be employed, if they do not adversely affect the reaction medium and thus adversely affect the yield of the desired products. When the reaction is accomplished under mild conditions as illustrated in some examples, the hydroxylamine solution is normally comprised of from about 1 to about 10 moles of alcohol, to about 1 mole of hydroxylamine. Greater and lesser amounts are also permissible.

With regard to the amount of reactants utilized, they also will vary and depend upon the reaction conditions such as the temperature and the reactants being employed, as well as the yield desired. Generally, it can be stated that the hydroxylamine is employed in a substantial excess, for example, from about 5 to 400 percent excess, and normally from about 10 to about 200 percent excess of the amount of cycloolefin used. In a preferred embodiment 3 to 20 moles and more preferably 3 to 10 moles of hydroxylamine per 1 mole of cycloolefin are employed. It is appreciated that other ratios of reactants can be utilized without departing from the spirit of the invention.

The desired product can be separated from the reaction mixture by a number of known methods, such as extraction, solution chromatography, and the like.

The compounds of the present invention are useful as intermediates in the preparation of insecticides, and also are useful as chelating agents with respect to metal ions, such as nickel, iron, and others. It is believed that a bidentate chelate complex is formed, when compounds of the present invention are reacted with a metal such as nickel, wherein two of the three oxime groups of the molecule participate in the bonding to the center metal atom. A typical complex structure is represented as follows:

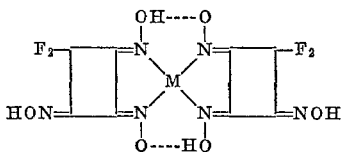

wherein M is metal such as iron or nickel. The metal coordination occurs through the nitrogen atoms of the molecule, thereby forming a stable chelate ring.

The chelate compounds are prepared by the mixing of stoichiometric amounts of an inorganic metal salt, such as sodium chloride or sodium carbonate, with the trioxime of the present invention, in a hot alcohol-water, or alcohol solution, which solution is at a temperature in excess of 40 degrees centigrade and preferably from 45 to 75 degrees centigrade, at a pH of 6 to 8. The resulting solution is cooled to below room temperature of about 25 degrees centigrade, and preferably to about 10 degrees centigrade, in an ice bath, thereby precipitating the metal complex. Subsequently the metal complex can be recovered by known techniques, such as filtration.

The metal chelate compounds of the present invention are useful in water purification, as sequestering agents and in academic study for investigating ligand bonding and ligand type reactions. They are also useful in many analytical metal ion separations. The compounds are specifically useful in supplying valuable metal ions to the soil. Thus a metal chelate such as the nickel oxime of the present invention can be applied to the soil in amounts ranging from 5 to 25 pounds per acre and preferably 10 to 15 pounds per acre, thereby providing to the soil a source of nickel. By adding the chelate of nickel to the soil, a controlled release of nickel ions is provided, thereby rendering such soil more fertile and allowing it to support growth of desirable vegetation more easily.

The following examples are presented to further illustrate the invention but are not intended to limit its scope. Unless specified otherwise, all temperatures are in degrees centigrade and all parts are by weight.

EXAMPLE 1.—PREPARATION OF HYDROXYLAMINE

In some of the following examples the hydroxylamine solutions used were prepared by slowly adding a solution of sodium methoxide, 59.4 grams (1.1 moles) in 350 milliliters of methanol, at zero degrees centigrate, to a solution of hydroxylamine hydrochloride, 83.4 grams (1.2 moles) in 470 milliliters of methanol, with ice cooling in order to keep the temperature below 30 degrees centigrade. After allowing the solution to stand for approximately 5 minutes to allow the precipitation of sodium chloride, filtration was effected to give a colorless solution of hydroxylamine 36.3 grams (1.1 moles) in 820 milliliters of methanol.

EXAMPLE 2

Hexafluorocyclobutene which was prepared by the reaction of 1,1,2-trifluoro-2-chloroethylene, in accordance with the procedure described by Rapp in the Journal American Chemical Society, volume 72, page 3642 (1950), and 15 grams (.097 mole) were introduced slowly through a gas dispersion tube into a stirred solution of 36.3 grams (1.1 moles) of hydroxylamine in 820 milliliters of methanol at zero degrees centigrade contained in a one liter flask fitted with a Dry Ice condenser, and a drying tube. The reaction mixture was stirred at zero degree centigrade for a period of 5 hours, and then at room temperature for 42 hours. The solution was evaporated under a vacuum of about 1 millimeter of mercury to incipient dryness, and the residue was extracted with eight 250 milliliter portions of ether. The ether solutions were then evaporated to 25 milliliters and chromatographed on a 3.5 x 60 centimeter Celite column. Elution with a 15 percent ether-85 percent hexane solution resulted in 2.6 grams, 72 percent yield of the product 1,2,3-trioximinodifluorocyclobutane which was obtained as a cream white solid and had a melting point of 128 degrees centigrade, with decomposition. Vacuum drying (at 50 degrees centigrade at approximately .1 millimeter of mercury) for 6 hours was necessary to remove the last traces of ether.

*Analysis.*—Calculated for $C_4H_3N_3F_2O_3$: C, 26.83 percent; H, 1.69 percent; N, 23.46 percent; F, 21.22 percent. Found: C, 27.37 percent; H, 2.08 percent; N, 23.05 percent; F, 20.42 percent.

EXAMPLE 3

15.5 grams (.080 mole) of 1,2-dichlorotetrafluorocyclobutene were added to a stirred solution of 18.2 grams (.55 mole) of hydroxylamine in 420 milliliters of methanol and refluxed at a temperature of about 65 degrees centigrade for 3.5 days. The resulting solution was evaporated and subsequently extracted with four 200 milliliter portions of tetrahydrofuran. The tetrahydrofuran was evaporated and the pasty residue was then dissolved in 25 milliliters of methanol and 10 milliliters of ether. Elution chromatography was then performed on the reaction mixture on a Celite eluting column with a 15 percent ether-45 percent hexane solution to result in 1,2,3-trioximinodifluorocyclobutane as a cream white solid having a melting point of 136 degrees centigrade, with decomposition.

EXAMPLE 4

In a manner similar to the process of Example 2, 21.2 grams (0.10 mole) of octafluorocyclopentene were treated with a solution of 36.3 grams (1.1 moles) of hydroxylamine in 820 milliliters of methanol. After 7 hours at zero degrees centigrade, 16 hours at room temperature and 24 hours at reflux temperature, namely, about 65 degrees centigrade, an additional 36.3 grams (1.1 moles) of hydroxylamine in 820 milliliters of methanol were added and the solution was refluxed for a further period of 62 hours, at a temperature of about 65 degrees centigrade. The solution was decanted and the brown residue remaining in the flask extracted with five 50 milliliter portions of ether. The decanted methanolic solution was evaporated and the resulting orange, pasty residue was extracted with twenty 250 milliliter portions of ether with stirring. Evaporation of the combined ether extracts resulted in a viscous reddish-orange oil which was dissolved in 10 milliliters of methanol and 50 milliliters of ether and chromatographed on an acid washed alumina column. Elution with a 50 percent hexane-50 percent ether solution resulted in 13.1 grams, 57 percent yield of a white solid having a melting point of 176 degrees centigrade with decomposition and identified as 1,2,3-trioximinotetrafluorocyclopentane. The product was vacuum dried at 0.1 millimeter of mercury at 50 degrees centigrade to remove the last traces of ether.

*Analysis.*—Calculated for $C_5H_3N_3F_4O_3$: C, 26.21 percent; H, 1.32 percent; N, 18.34 percent; F, 33.17 percent. Found: C, 26.52 percent; H, 1.10 percent; N, 18.46 percent; F, 32.79 percent.

EXAMPLE 5

12.2 grams (.050 mole) of 1,2-dichlorohexafluorocyclopentene were added to a stirred solution of hydroxylamine 36.3 grams (1.1 moles) in 820 milliliters of methanol and refluxed at a temperature of about 65 degrees centigrade for 7 days. The solution was evaporated and the residue extracted with twenty 150 milliliter portions of ether. The ether solution was evaporated and the resultant yellow paste digested with three 100 milliliter portions of boiling chloroform. The residue was vacuum dried at 50 degrees centigrade under a pressure of 0.1 millimeters of mercury for 24 hours and resulted in 9 grams, 79 percent yield of a cream-yellow solid melting at 171–172 degrees centigrade with decomposition and identified as 1,2,3-trioximinotetrafluorocyclopentane.

In addition to the physical data presented, the products and their structures were identified by infrared spectral data, proton nuclear magnetic resonance data and the preparation of derivatives, such as 1,2,3-tris(methoximino)difluorocyclobutane of the structure

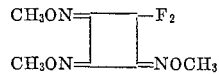

and 1,2,3 - tris(methoximino)tetrafluorocyclopentane of the structure

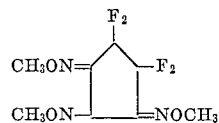

which were prepared by the reaction of the corresponding trioximes of the present invention with diazomethane.

While there have been described various embodiments of the invention, the compositions and methods described are not intended to be understood as limiting the scope of the invention as it is realized that changes therewithin are possible, and it is further intended that each element recited in any of the following claims is intended to be understood as referring to all equivalent elements for accomplishing substantially the same results in substantially the same or equivalent manner, it being intended to cover the invention broadly in whatever form its principles may be utilized.

What is claimed is:

1. Trioximinofluorocycloalkanes of the formula

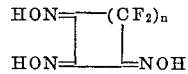

wherein $n$ is a number from 1 to 2.

2. The compound of claim 1 wherein $n$ is 1.
3. The compound of claim 1 wherein $n$ is 2.
4. A process for the preparation of trioximinofluorocycloalkanes of the formula

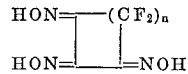

which comprises reacting a cycloolefin of the formula

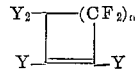

with a lower alkanolic solution of hydroxylamine wherein the hydroxylamine is employed in at least 5 percent excess of the amount of cycloolefin used at a temperature in the range of from about zero degree centigrade to 75 degrees centigrade, wherein $n$ is a number from 1 to 2 and Y is a halogen atom selected from the group consisting of chlorine and fluorine.

5. A process in accordance with claim 4 wherein hexafluorocyclobutene is utilized as one of the reactants, and the product recovered is 1,2,3-trioximinodifluorocyclobutane.

6. A process in accordance with claim 4 wherein octafluorocyclopentene is utilized as the reactant, and the product recovered is 1,2,3-trioximinotetrafluorocyclopentane.

7. A process in accordance with claim 4 wherein the lower alkanol is methanol and the desired product is separated from the reaction mixture.

8. A process in accordance with claim 7 wherein the hydroxylamine is prepared by mixing and reacting together a solution of sodium methoxide and methanol, with a solution of hydroxylamine hydrochloride and methanol, and removing the sodium chloride produced.

References Cited

UNITED STATES PATENTS 3,141,043   7/1964   McBee _____ 260—566

OTHER REFERENCES

Knunyants: "Chem. Abst.," vol. 62, col. 2700 c (1965).

LEON ZITVER, Primary Examiner

MATTHEW M. JACOB, Assistant Examiner

U.S. Cl. X.R.

71—97; 210—42; 260—439